United States Patent
Pawar et al.

(10) Patent No.: US 9,612,792 B2
(45) Date of Patent: Apr. 4, 2017

(54) DYNAMIC ADJUSTMENT OF AUDIO PRODUCTION

(71) Applicant: Intel Corporation, Santa Clara, CA (US)

(72) Inventors: Sagar C. Pawar, Bangalore (IN); Prakash Pillai, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 14/739,954

(22) Filed: Jun. 15, 2015

(65) Prior Publication Data

US 2016/0364207 A1 Dec. 15, 2016

(51) Int. Cl.
*G06F 17/00* (2006.01)
*G06F 3/16* (2006.01)

(52) U.S. Cl.
CPC .................................... *G06F 3/165* (2013.01)

(58) Field of Classification Search
CPC ...................................................... G06F 3/165
USPC ............................ 700/94; 381/56–63, 77–86
See application file for complete search history.

(56) References Cited

U.S. PATENT DOCUMENTS

| | | | | |
|---|---|---|---|---|
| 5,581,621 A * | 12/1996 | Koyama | ................. | H04S 7/301 381/103 |
| 7,190,796 B1 * | 3/2007 | Kashani | .................. | H03G 3/32 381/71.1 |
| 8,942,395 B2 * | 1/2015 | Lissaman | ............... | H04R 27/00 381/303 |
| 8,965,544 B2 * | 2/2015 | Ramsay | ................. | H04R 27/00 700/94 |
| 9,294,840 B1 * | 3/2016 | Anderson | ................ | H04R 5/00 |
| 2002/0136414 A1 * | 9/2002 | Jordan | ...................... | H04S 3/00 381/58 |
| 2003/0014486 A1 * | 1/2003 | May | ....................... | H04R 27/00 709/204 |
| 2013/0070860 A1 * | 3/2013 | Schramm | ............. | H04J 3/0682 375/240.25 |
| 2014/0380159 A1 * | 12/2014 | Reilly | ..................... | G06F 3/017 715/716 |

\* cited by examiner

*Primary Examiner* — Hemant Patel
(74) *Attorney, Agent, or Firm* — Schwabe, Williamson & Wyatt, P.C.

(57) ABSTRACT

Apparatuses, methods, and computer-readable media for dynamic configuration of audio production are described. Audio production nodes ("APNs") may produce audio. The APNs and may be configured to be compliant with a Precision Time Protocol ("PTP"). The APNs may be configured to perform dynamic configuration of audio production. An APN may receive configuration-related information transmitted from one or more other APNs, such as in association with operation of the PTP. An APN, in response to receipt of this configuration-related data, may modify configuration settings used for its audio production such as modification of timing, tone, power, intensity, equalization settings, or other configuration settings. The APN may be configured to produce its own configuration-related data for use by other APNs to modify the other APNs' configuration settings. Other embodiments may be described and/or claimed.

24 Claims, 10 Drawing Sheets

DYNAMIC ADJUSTMENT OF AUDIO PRODUCTION

TECHNICAL FIELD

The present disclosure relates to the field of data processing, in particular, to apparatuses, methods and storage media associated with configuring audio production nodes during audio production.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In existing audio production systems, sometimes multiple audio production devices may be utilized to produce audio. For example, if audio is to be presented in a large space, multiple speakers may be set up in the space to produce this audio. These speakers (or other audio production devices) may be set up in various locations based on environmental aspects, such as crowd density, room shape, room surface reflectivity, furniture placement, etc. In various embodiments, in order to provide a consistent experience, audio production devices may be configured by a central host device. In such scenarios, the host device may provide audio files, such as, for example, mp3s or files in other audio production formats, which may be produced from the audio production devices. The host device may also provide configuration to the audio production devices to provide a more suitable experience for listeners. For example, the host device may configure, for example, volume, pitch control, balance, equalizer settings, etc. However, the ability of the host to configure these devices may not provide adequate configuration, and in particular may not provide audio production that is responsive to dynamic demands during audio production.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
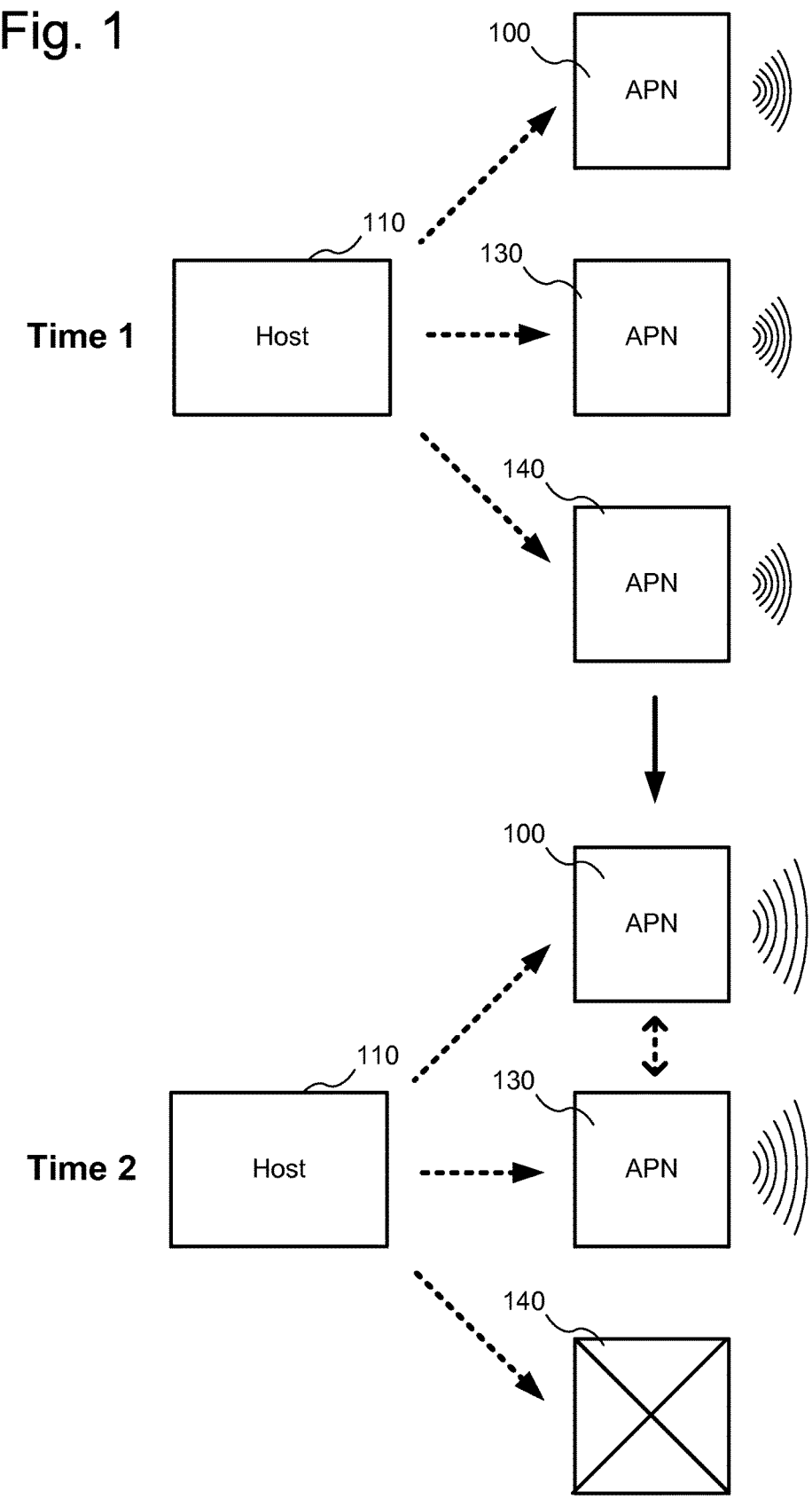
FIG. 1 illustrates a first example of dynamic configuration of audio production nodes, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a dynamic configuration audio production system may be configured to produce audio for consumption while supporting modification of configuration during audio production. In various embodiments, a plurality of audio production nodes ("APNs") may interoperate with a host node to produce audio. In various embodiments, the APNs and host node may be configured to be compliant with a Precision Time Protocol ("PTP"), such as an IEEE 1588 protocol, and in particular for configuring clock synchronization between a host and an APN and/or between APNs; however, in various embodiments, other protocols may be utilized. The APH may be configured to provide audio production data, such as mp3, Advanced Audio Coding ("AAC"), Waveform Audio File Format ("WAV"), or other audio production formats, for play by the APNs. The APNs may, in turn receive this audio production data from the APH and then produce audio from the audio production data for consumption by consumers, such as through integrated speakers in the APNs. In various embodiments, the APNs and APH may be configured to communicate through networked communications, such as wired or wireless networking.

In various embodiments, the APNs may be configured to perform dynamic configuration of audio production. In various embodiments, an APN may receive configuration-related information transmitted from one or more other APNs. In various embodiments, the configuration-related information may be transmitted and/or received by APNs in association with operation of the PTP. In particular, the APNs may be configured to transmit and/or receive configuration-related information in association with clock updates sent and/or received as part of operation of the PTP.

The APN, in response to receipt of this configuration-related data, may modify configuration settings used for its audio production. In various embodiments, such modification may include, but is not limited to, modification of timing, tone, power, intensity, equalization settings, or other configuration settings. In various embodiments, the APN may be configured to produce its own configuration-related data for use by other APNs to modify the other APNs' configuration settings. In various embodiments, the APNs may be configured to send configuration-related data based on one or more APNs becoming unavailable to participate in audio production, such as if an APN is turned off or experiences failure. In other embodiments, the APN may be configured to receive audio data from an audio sensor, such as audio data representing audio produced by other APNs. The APN may compare this received audio data to audio production data for audio being produced by APNs in the system. The APN may then, in turn determine if differences exist between the received audio data and the audio production data, and may provide configuration-related data based on these differences to other APNs. Particular embodiments and implementation details are described below.

Referring now to FIG. 1, a first example of dynamic configuration of audio production nodes is illustrated in accordance with various embodiments. In the example of FIG. 1, a host node 110 may be configured to communicate with one or more audio production nodes, such as audio production nodes 100, 130, and 140 ("APNs 100, 130, and 140"). In various embodiments, the host node 110, as well as the audio production nodes 100, 130, and 140 may be implemented using various computing devices, examples of which are described herein. At a first time ("Time 1"), the APNs 100, 130, and 140 may produce audio based on audio production data (e.g., files in formats such as mp3, WAV, AAC, etc.). This audio production data may be communicated from the host node 110 to the APNs using a variety of communication techniques, such as, but not limited to, wired or wireless networking, or other wireless communication protocols, such as Bluetooth. The host node 110 may be configured to provide audio configuration settings for the APNs 100, 130, and 140 which may control or adjust audio production performed by the APNs. In the example of FIG. 1, at Time 1, the APNs 100, 130, and 140 are each producing audio at the same volume (which is represented in FIG. 1 by the same-sized audio waves associated with each APN).

FIG. 1 also illustrates that, at a later Time 2, a change in the status of one of the APNs has occurred. In the particular example of FIG. 1, at Time 2, APN 140 has ceased producing audio. In various embodiments, such a cessation of audio production may occur for various reasons, including device failure, a user powering the APN off, other loss of power, etc. In other embodiments, other changes may occur, such as volume changes, changes in environment, etc., which may affect audio produced by one or more APNs. Other examples of status changes are described herein.

In various embodiments, in response to the change in the status of the APN 140, one or more APNs may modify their configuration settings, such as to adjust for the loss of the audio produced by the APN 140. Thus, in the example of FIG. 1, the APNs 100 and 130 have increased the volume of the audio they are producing to counteract the loss of the audio that is no longer being produced by APN 140. In various embodiments, the APNs 100 and 130 may be facilitated in modifying their configuration settings through communication between the APNs. Thus, for example, if the APN 130 detects that the APN 140 is no longer producing audio, APN 140 may communicate configuration-related data to the APN 100 to facilitate the APN 100 in modifying its configuration settings. In various embodiments, this inter-APN communication may be performed via various methods, including wired or wireless networking, or other wireless methods, such as Bluetooth™. In various embodiments the inter-APN communication may be performed in association with updates performed during implementation of a PTP. It may be noted that, while in the example of FIG. 1 the APNs 100 and 130 have adjusted their configuration settings to produce audio with a higher volume, in other embodiments, other adjustments may be made, such as modifications to pitch, equalization settings, timing, or other configuration settings.

Figure 2:
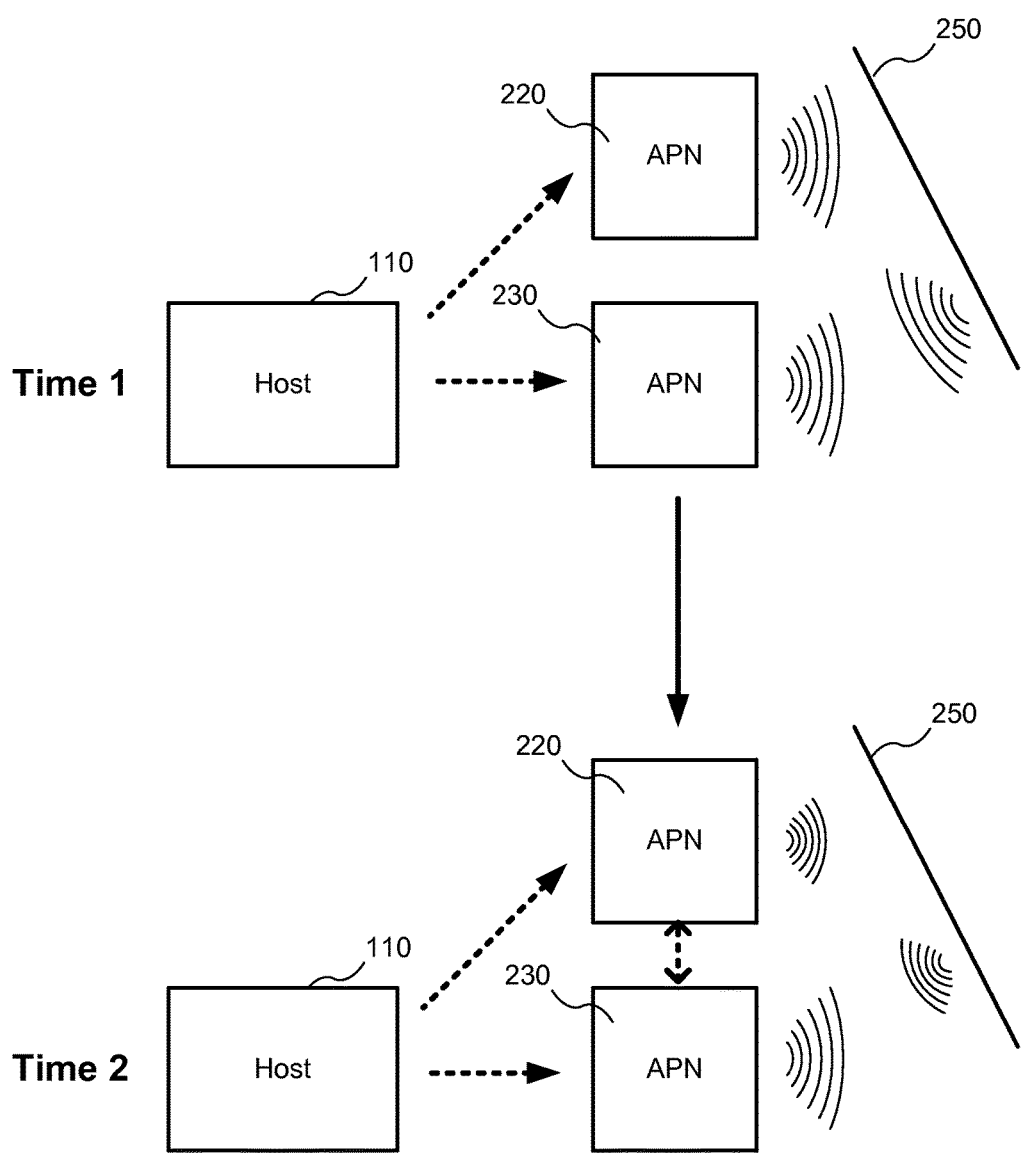
FIG. 2 illustrates a second example of dynamic configuration of audio production nodes, in accordance with various embodiments.

Referring now to FIG. 2, a second example of dynamic configuration of audio production nodes is illustrated in accordance with various embodiments. In the example of FIG. 2, two APNs 220 and 230 have been configured to produce audio by the host node 110. At Time 1, the APNs 220 and 230 have both been configured to produce audio at the same volume. However, there is also an environmental feature 250, such as a wall or piece of furniture, which is located closer to APN 220 than to APN 230. In the scenario illustrated in FIG. 2, the environmental feature is causing a reflection of the audio being produced by APN 220. This audio may interfere with the audio produced by APN 230. For example, in various scenarios audio waves coming from different sources (such as, for example, audio produced by APN 230 and reflected from environmental feature 250) may exhibit constructive and/or destructive interference. Such interference is known to cause potential changes in the resulting audio that may result in less than optimal experience to consumers of the audio. As such, a person that is standing between the APN 230 and the environmental feature 250 may experience a sub-optimal audio experience.

In various embodiments, the APNs 220 and 230 may be configured to dynamically configure audio production in order to adjust for the presence of the environmental feature 250. In various embodiments, the APN 230 may be configured to detect audio from the environment (such as the reflected audio) and compare it to audio that should be heard. The APN 230 may perform such comparison based on knowledge of audio that should be heard from APN 220; the APN 230 may have this knowledge based on information received from the host node 110, the APN 220, or from other host nodes or APNs. In various embodiments, the APN 230 may send configuration-related data to the APN 220 to inform the APN 220 that there are differences in the audio being heard from the APN 220 and what is expected to be heard. In various embodiments, the APN 220 may, in turn modify its configuration settings in order to account for these differences. Thus, as illustrated in FIG. 2, at Time 2 the APN 220 has reduced its volume such that less audio is reflected from the environmental feature 250. While the example of FIG. 2 illustrates a modification of the volume used by APN 220, in various embodiments, other modifications to the configuration settings may be utilized, as described herein.

Figure 3:
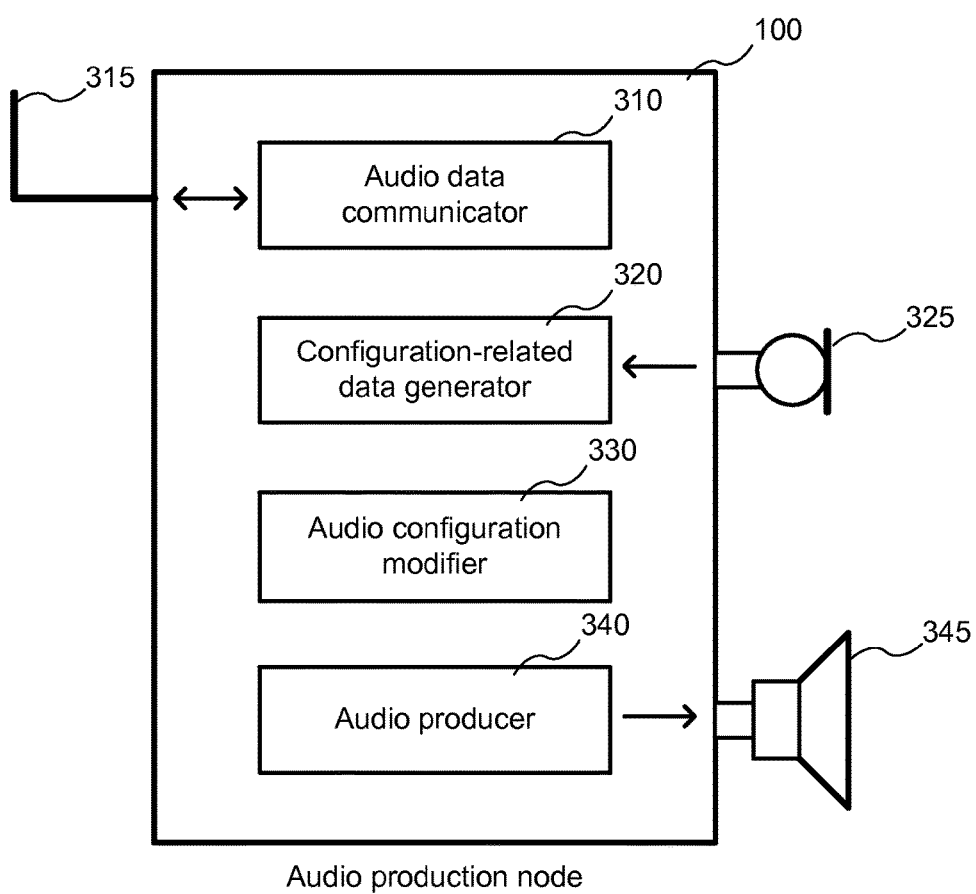
FIG. 3 illustrates examples of an audio production node, in accordance with various embodiments.

Referring now to FIG. 3, examples of an APN 100 are illustrated in accordance with various embodiments. It may be noted that, while particular modules or components are illustrated as being part of the APN 100, in various embodiments components and/or modules may be merged, split into additional entities, and/or omitted entirely. In various embodiments, the APN 100 may include various form factors, as may be understood, including standalone speakers, embedded speakers, laptop or desktop computers, mobile devices, etc. In various embodiments, the APN 100 may be configured to be compliant with an IEEE 1588 protocol for configuring audio production between a host; however, in various embodiments, other protocols may be utilized.

In various embodiments, the APN 100 may include an audio data communicator 310 ("ADC 310") which may be configured to transmit and/or receive various types of audio-related data which may be utilized by the APN 100 to perform dynamic audio production configuration as described herein. For example, the ADC 310 may be configured to receive audio production data (e.g., mp3s, WAVs, AACs, etc.) for the APN 100 to use to produce audio. Such audio production data may be received, for example, from the host node 110. In other embodiments, the ADC 310 may be configured to receive audio configuration settings data from the host node 110. For example, the ADC 310 may receive volume, tone, timing, balance, and/or equalization settings from the host node 110. In other embodiments, other audio configuration settings data may be received. In various embodiments, the ADC 310 of the APN 100 may be configured to receive configuration-related data from other APNs. For example, in the example described above with respect to FIG. 1, the ADC 310 may receive configuration-related data describing cessation of audio production by a particular APN. In another example, in the example described above with respect to FIG. 2, the ADC 310 may receive configuration-related data describing differences between audio produced by the 100 that is heard by another APN and the audio production data that from which audio is being produced by the APN 100. In various embodiments, the ADC 310 may be configured to communicate via a variety of communication methods or protocols, including wired and/or wireless networking. In various embodiments, the ADC 310 may be coupled to an antenna 315 to facilitate such communications, or to wired communications hardware, as may be understood (not illustrated).

In various embodiments the APN 100 may also include an audio producer 340 ("AP 340"). In various embodiments, the AP 340 may be configured to produce audio from audio production data, such as may be received from the host node 110. In various embodiments, the AP 340 may include various audio playback technologies, such as hardware and/or software that may be configured to play audio described in the audio production data. For example, in embodiments where mp3 data is provided by the host node 110, the AP 340 may include mp3 playback software. In various embodiments, the AP 340 may be operatively coupled to playback hardware, such as a speaker 345 in order to perform audio production; in other embodiments, other hardware may be used for audio production, as may be understood. In various embodiments, the AP 340 may be configured to perform audio production based at least in part on one or more audio configuration settings, such as may be set by the host node 110 during set up of the APN 100. In various embodiments, the audio configuration settings may include, balance, volume, timing, tone, and/or equalization settings, as well as other settings as may be understood. The AP 340 of the APN 100 may be configured such, that, when these audio configuration settings are later modified, the audio produced by the AP 340 is modified as well.

In various embodiments, the APN 100 may include an audio configuration modifier 330 ("ACM 330"). In various embodiments, the ACM 330 may be configured to modify the audio configuration settings of the APN 100, and thus adjust production of audio by the AP 340. In various embodiments, the ACM 330 may be configured to modify audio configuration settings of the APN 100 based on configuration-related data that may be received, such as via the ADC 310, from another APN 100. In various embodiments, the ACM 330 may be configured to receive configuration-related data describing cessation of audio production by one or more APNs, such as device failure or an APN being turned off or losing power. In other embodiments, the ACM 330 may be configured to receive configuration-related data describing one or more changes in production of audio by one or more APNs. For example, an APN may have its settings manually changed by a user, such as if the volume or equalization settings of the APN are modified by the user. In other embodiments, the ACM 330 may be configured to receive configuration-related data describing differences between audio produced by the APN 100 and audio heard by another APN.

In various embodiments, in response to receipt of the configuration-related data, the ACM 330 may be configured to adjust audio configuration settings used by the AP 340 when producing audio. Thus, as discussed above with respect to the example of FIG. 1, the ACM 330 of the APN 100 increased the volume setting for audio production in response to receiving configuration-related data describing that APN 140 had ceased producing audio. Similarly, in the example of FIG. 2, the ACM 330 of the APN 100 decreased the volume setting for audio production in response to receiving configuration-related data describing that there were conflicts relating to reflected audio. Particular techniques for modification may be understood by those of ordinary skill.

In various embodiments, the APN 100 may include a configuration-related data generator 320 ("CDG 320"). In various embodiments, the CDG 320 may be configured to generate configuration-related data to be transmitted to other APNs. The CDG 320 may, in some embodiments, be configured to receive and/or forward status updates for other APNs, such as device success status, current playback status, power status, and/or current audio configuration settings for other APNs. In other embodiments, the CDG 320 may be operatively coupled to an audio sensor 325, such as a microphone. In such embodiments, the CDG 320 may be configured to receive audio data produced by one or more other APNs through the audio sensor 325. The CDG 320 may then be configured to determine differences between the received audio data and audio production data for the one or more other APNs. The CDG 320 may then send information based on these differences as configuration-related data to the one or more other APNs.

Figure 4:
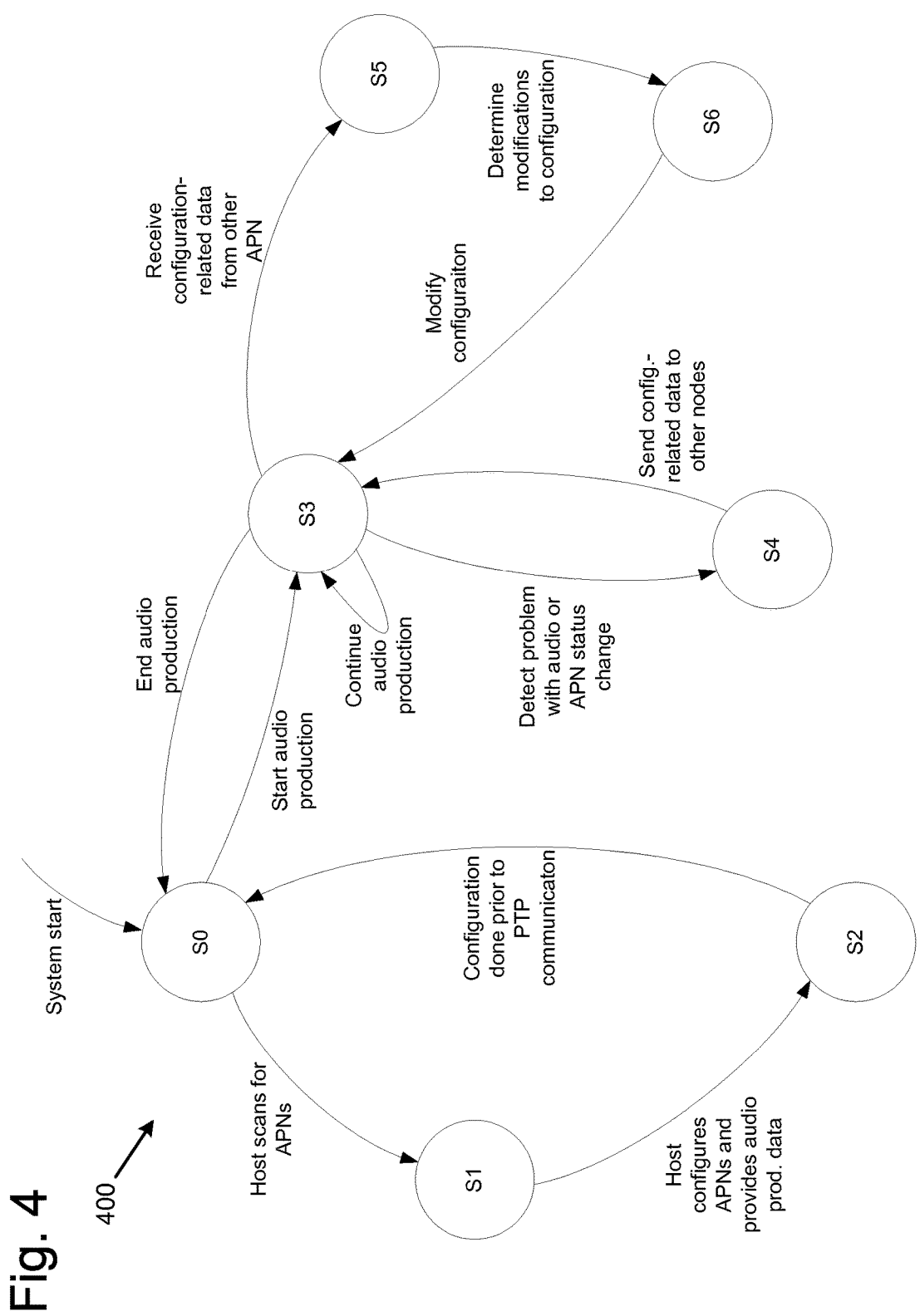
FIG. 4 illustrates an example state diagram for an audio production node as described herein, in accordance with various embodiments.

Referring now to FIG. 4, an example state diagram 400 for an APN 100 as described herein is illustrated in accordance with various embodiments. While particular states are illustrated in FIG. 4, in various embodiments, APNs may incorporate additional states and/or remove illustrated states while practicing techniques described herein. Audio production configuration may start when a system including APN 100 is started, leading the APN 100 to enter a startup state S0. Next, the host node 110 may scan for the APN 100, leading to state 51. The host node 110 may configure the APN 100 by sending configuration settings data to the APN 100 (as well as other scanned APNs) to transition to state S2. In various embodiments, the audio configuration settings data sent to the APN 100 may be based at least in part on the location of the APN 100, such as to better ensure a consistent experience for consumers of audio produced by the APN 100 as well as other scanned APNs. The host node 110 may also configure the APN 100 by sending audio production data to the APN 100. The APN 100 may then return to the stable state S0 after configuration is performed. In various embodiments, the APN 100 may communicate with other APNs to synchronize timing for audio production using PTP or other technologies.

While in state S0, the host node 110 may also instruct the APN 100 to begin audio production, as may be understood, leading to state S3, where the AP 340 of the APN 100 is producing audio. The APN 100 may maintain this audio production state until dynamic audio configuration actions occur. For example, the APN 100 may detect a problem with the audio production or a status change to an APN and transition to state S4, where the CDG 320 of the APN 100 may generate configuration-related data. In various embodiments, this transition may occur in association with a clock update, such as through implementation of a PTP. The CDG 320 may then cause the ADC 310 to send the configuration-related data to one or more other nodes, and may return to state S3. In another example, at state S3, the ACM 330 may receive configuration-related data, via the ADC 310, from another APN, leading to state S5. In various embodiments, this transition may also occur in association with a clock update, such as through implementation of a PTP. The ACM 330 may then determine one or more modifications to the audio configuration settings of the APN 100, leading to state S6, and may then modify the audio configuration settings and return to state S3.

Figure 5:
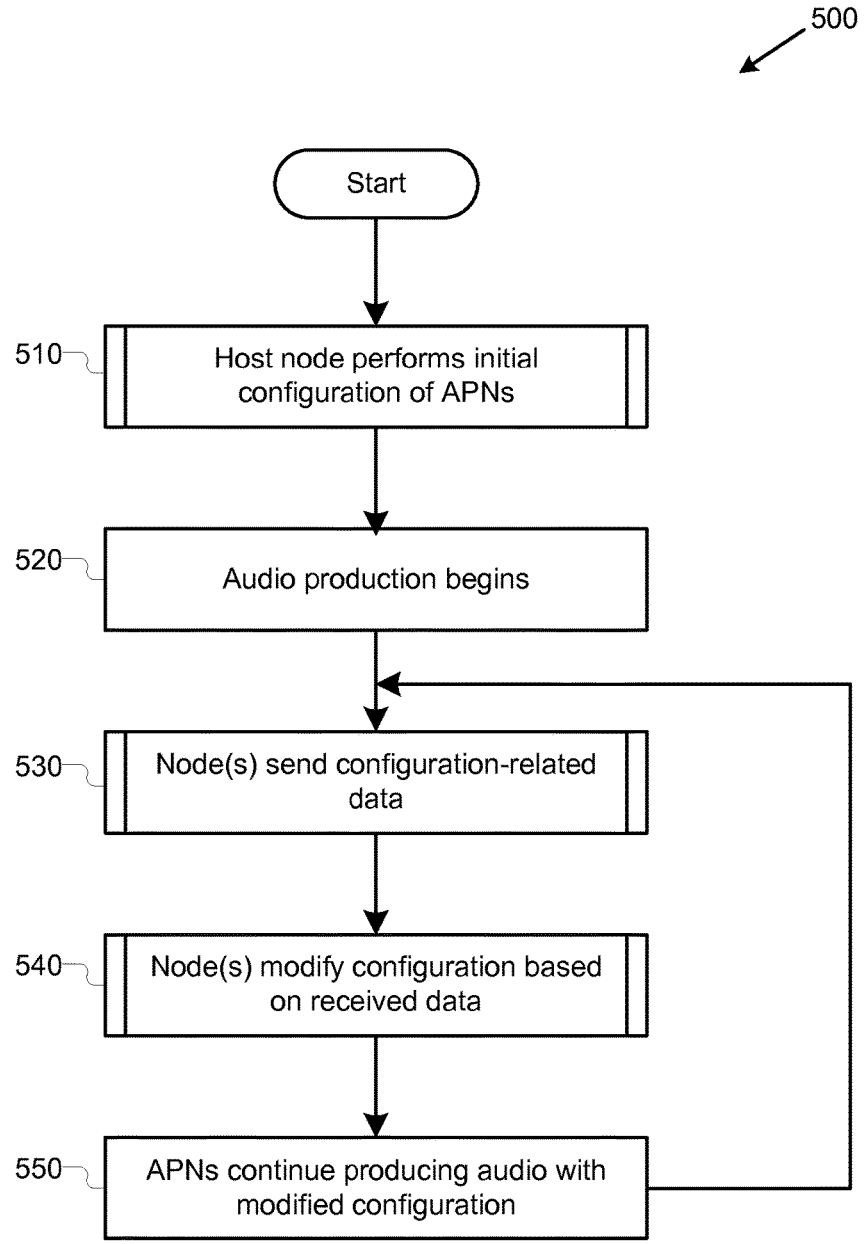
FIG. 5 illustrates an example process for dynamic configuration of audio production, in accordance with various embodiments.

Referring now to FIG. 5, an example process 500 for dynamic configuration of audio production is illustrated in accordance with various embodiments. While FIG. 5 illustrates particular operations in a particular order, in various embodiments the operations may be combined, split into parts, and/or omitted. The process may begin at operation 510, wherein the host node 110 may perform an initial configuration of one or more APNs 100. Particular embodiments of the process of operation 510 may be described below with reference to process 600 of FIG. 6. Next, at operation 520, audio production may begin using the one or more APNs 100. Next, at operation 530, APNs 100 out of the one or more APNs 100 may send configuration-related data to other APNs 100. In various embodiments, this operation may occur in association with a clock update, such as through implementation of a PTP. Particular embodiments of the process of operation 530 may be described below with reference to process 700 of FIG. 7. Next, at operation 540, the APNs 100 which received configuration-related data may modify their audio configuration settings based on the received configuration-related data. Particular embodiments of the process of operation 540 may be described below with reference to process 800 of FIG. 8. Next, at operation 550, the APNs 100 may continue producing audio suing the newly modified audio configuration settings. The process may then return back to operation 530 to continue with dynamic configuration as audio production continues.

Figure 6:
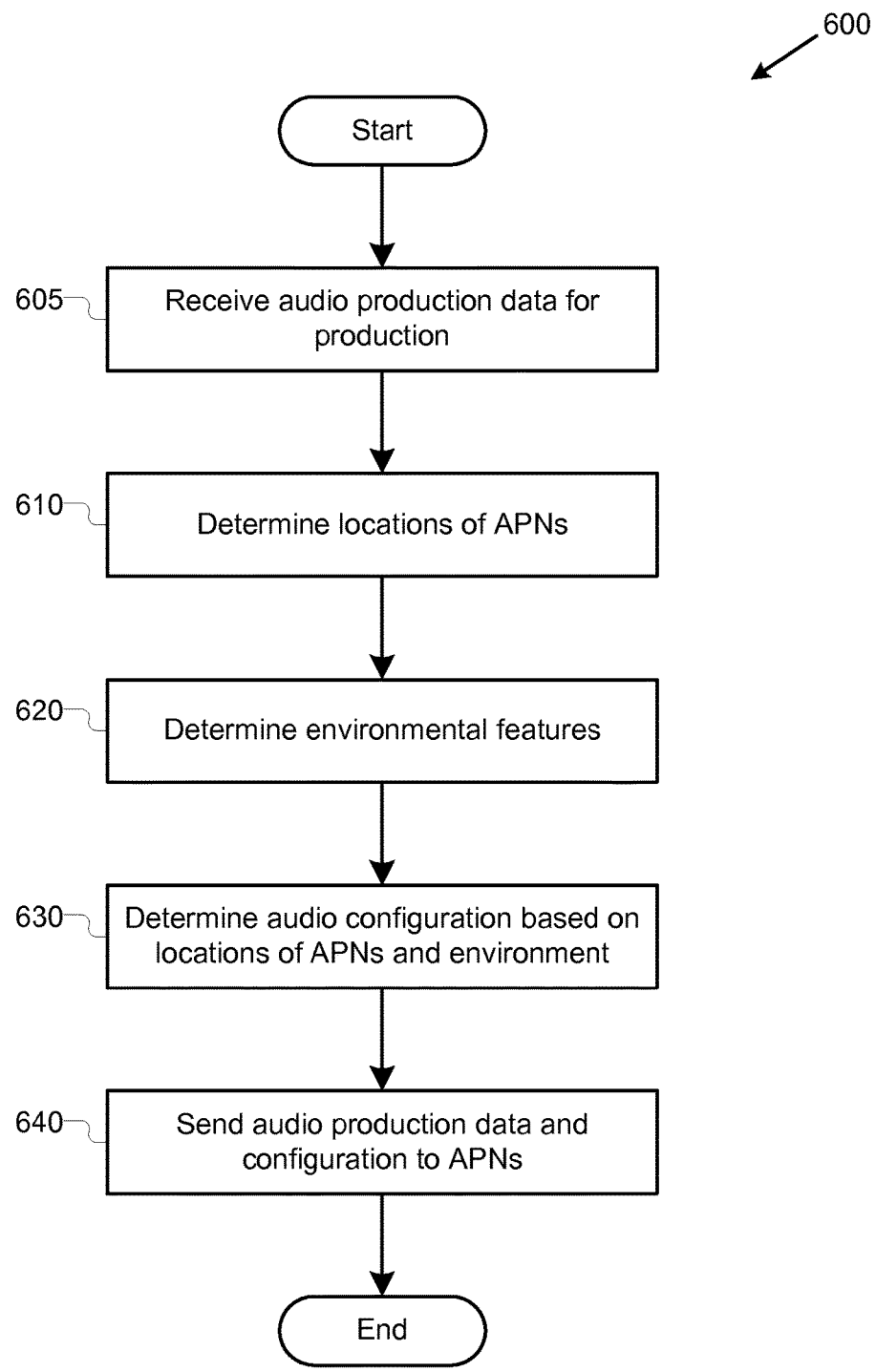
FIG. 6 illustrates an example process for performing an initial configuration of audio production nodes, in accordance with various embodiments.

Referring now to FIG. 6, an example process 600 for performing an initial configuration of audio production nodes is illustrated in accordance with various embodiments. In various embodiments, process 600 may be performed to implement, in whole or in part, operation 510 of process 500 of FIG. 5. While FIG. 6 illustrates particular operations in a particular order, in various embodiments the operations may be combined, split into parts, and/or omitted. The process may begin at operation 605, where the host node 110 may receive audio production data for production. For example, the host node 110 may be provided with an audio file or provided with a link to a stream from which audio production data may be received. Next, at operation 610, the host node 110 may determine locations for APNs 100 which may be producing audio. In various embodiments, these locations may be determined relative to the host node 110 and/or may be determined as absolute locations. Next at operation 620, the host node 110 may determine environmental features which may affect audio production. For example, the host node 110 may determine the size and/or shape of spaces in which audio may be produced. In another example, the host node 110 may determine the location, orientation, composition, and/or size of objects or surfaces which may reflect or absorb audio. Next, at operation 630, the host node 110 may determine initial audio configuration settings for the APNs 100 based on the determined locations of the APNs 100 and the determined environmental features. Techniques for determining initial audio configuration settings may be understood to those of ordinary skill. Next, at operation 640, the host node 110 may send audio production data and audio configuration settings data to the APNs 100, to be received by the ADCs 310 of the APNs 100. The process may then end.

Figure 7:
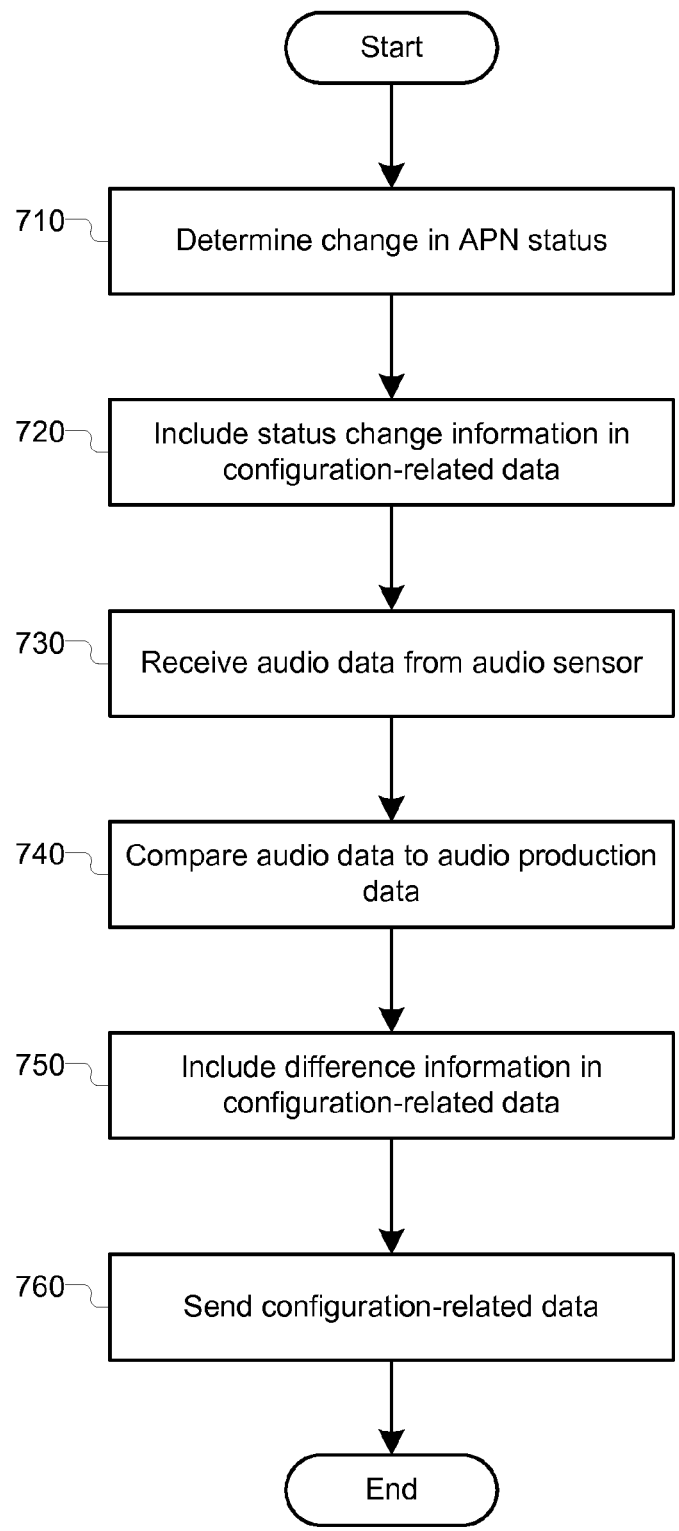
FIG. 7 illustrates an example process for an audio production node sending configuration-related data, in accordance with various embodiments.

FIG. 7 illustrates an example process for an APN 100 sending configuration-related data, in accordance with various embodiments. In various embodiments, process 700 may be performed to implement, in whole or in part, operation 530 of process 500 of FIG. 5. While FIG. 7 illustrates particular operations in a particular order, in various embodiments the operations may be combined, split into parts, and/or omitted. The process may begin at operation 710, where the CDG 320 of the APN 100 may determine a change in the status of another APN. Examples of status changes are described herein, but may include status changes such as cessation of audio production, device failure, power changes, and/or manual audio configuration settings changes. In various embodiments, the CDG 320 may determine the status change through receipt of status information from one or more other APNs; this status information, in various embodiments, may or may not come from the particular APN for which the status has changed. In other embodiments the CDG 320 may determine the status change by inferring the change based on the lack of communication from another APN. For example, if the APN 100 regularly receives communications from another APN, but has not received communications after a threshold period of time, the CDG 320 may infer that the APN which has not been heard from is no longer responsive and is not producing audio. Other techniques for determination of status changes may be understood by those of ordinary skill. Next, at operation 720, the CDG 320 may include status-change information representing the determined change in status in configuration-related data to be sent to another APN.

Next, at operation 730, the CDG 320 may receive audio data from the audio sensor 325, and, at operation 740, the CDG 320 may compare the received audio data to the previously-received audio production data to determine differences between the two. In various embodiments, at operation 740, the CDG 320 may compare the received audio data to the audio production data based on in part on knowledge of other APNs as well as their audio configuration settings. For example, if the APN 100 has knowledge that another APN has been set to produce audio with a particular delay, or with particular settings to tone, volume, or equalization settings, the CDG 320 may take these settings into account when performing its comparison. Next, at operation 750, the CDG 320 may include the determined differences in configuration-related data to be sent to the particular APN for which the differences were determined. Finally, at operation 760, the APN 100 may send the configuration-related data to one or more APNs for which audio configuration settings may need to be modified based on the configuration-related data. The process may then end.

Figure 8:
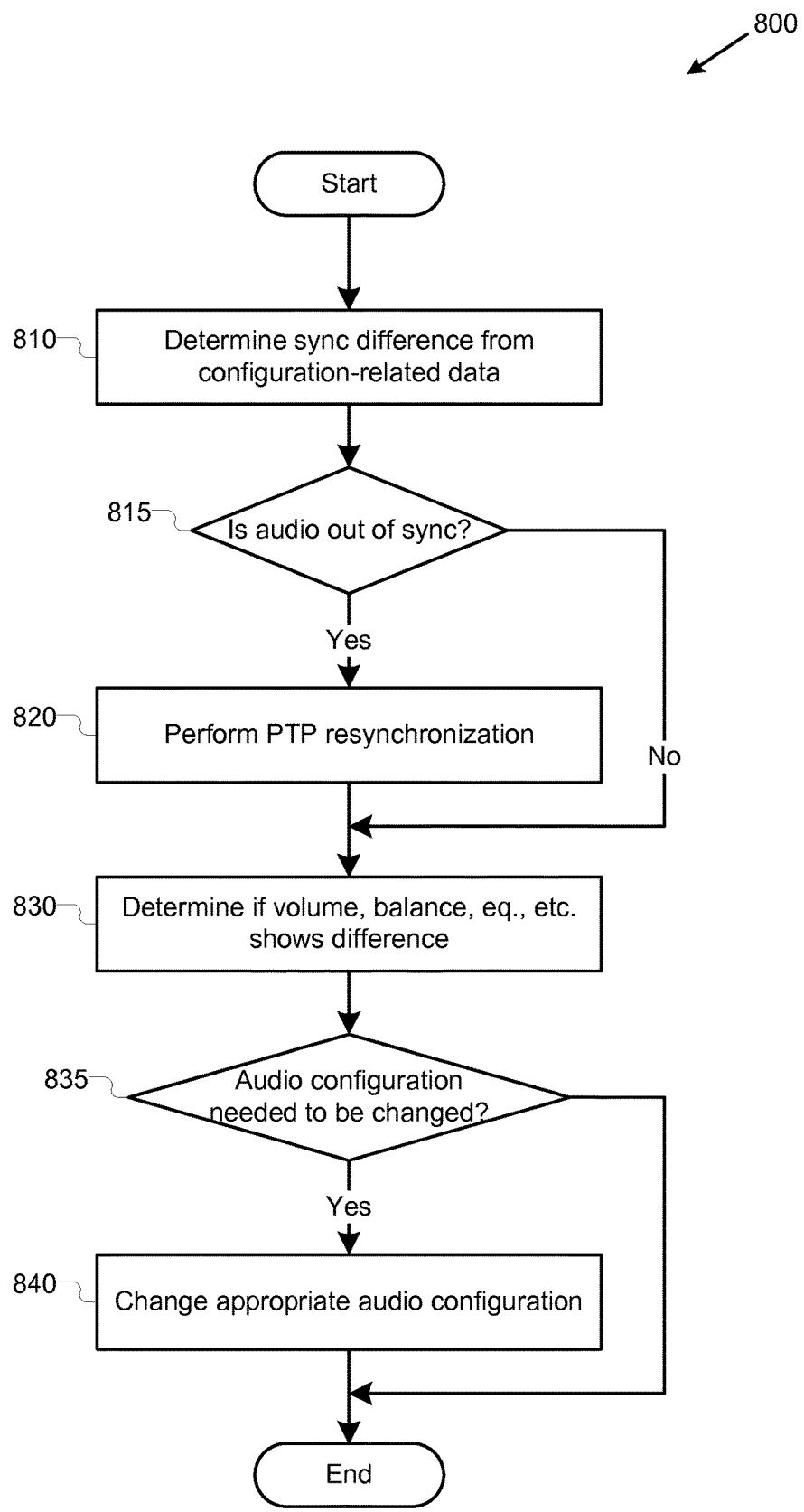
FIG. 8 illustrates an example process for an audio production node modifying its configuration based on received configuration-related data, in accordance with various embodiments.

Referring now to FIG. 8, an example process 800 for an APN 100 modifying its configuration based on received configuration-related data is illustrated in accordance with various embodiments. In various embodiments, process 800 may be performed to implement, in whole or in part, operation 540 of process 500 of FIG. 5. While FIG. 8 illustrates particular operations in a particular order, in various embodiments the operations may be combined, split into parts, and/or omitted. The process may begin at operation 810, where the ACM 330 may determine whether, based on the configuration-related data, the audio being produced by the AP 340 has a synchronization difference with the audio produced by other APNs. At decision operation 815, the APN 100 may determine if the audio is out of sync. If so, then at operation 820, the APN 100 may perform a peer-to-peer resynchronization with the APN that sent the configuration-related data. Regardless of whether peer-to-peer resynchronization was performed, then at operation 830, the ACM 330 may determine if the configuration-related data shows that there is a difference in audio configuration settings such as balance, tone, volume, or equalization between the configuration-related data and what is currently being produced. At decision operation 835, the APN 100 may determine whether the audio configuration needs to be changed based on the determination of these differences, or based on status changes to other APNs, such as, for example, cessation of audio production. If so, then at operation 840, the appropriate audio configuration setting is changed based on the determined differences. The process may then end.

Figure 9:
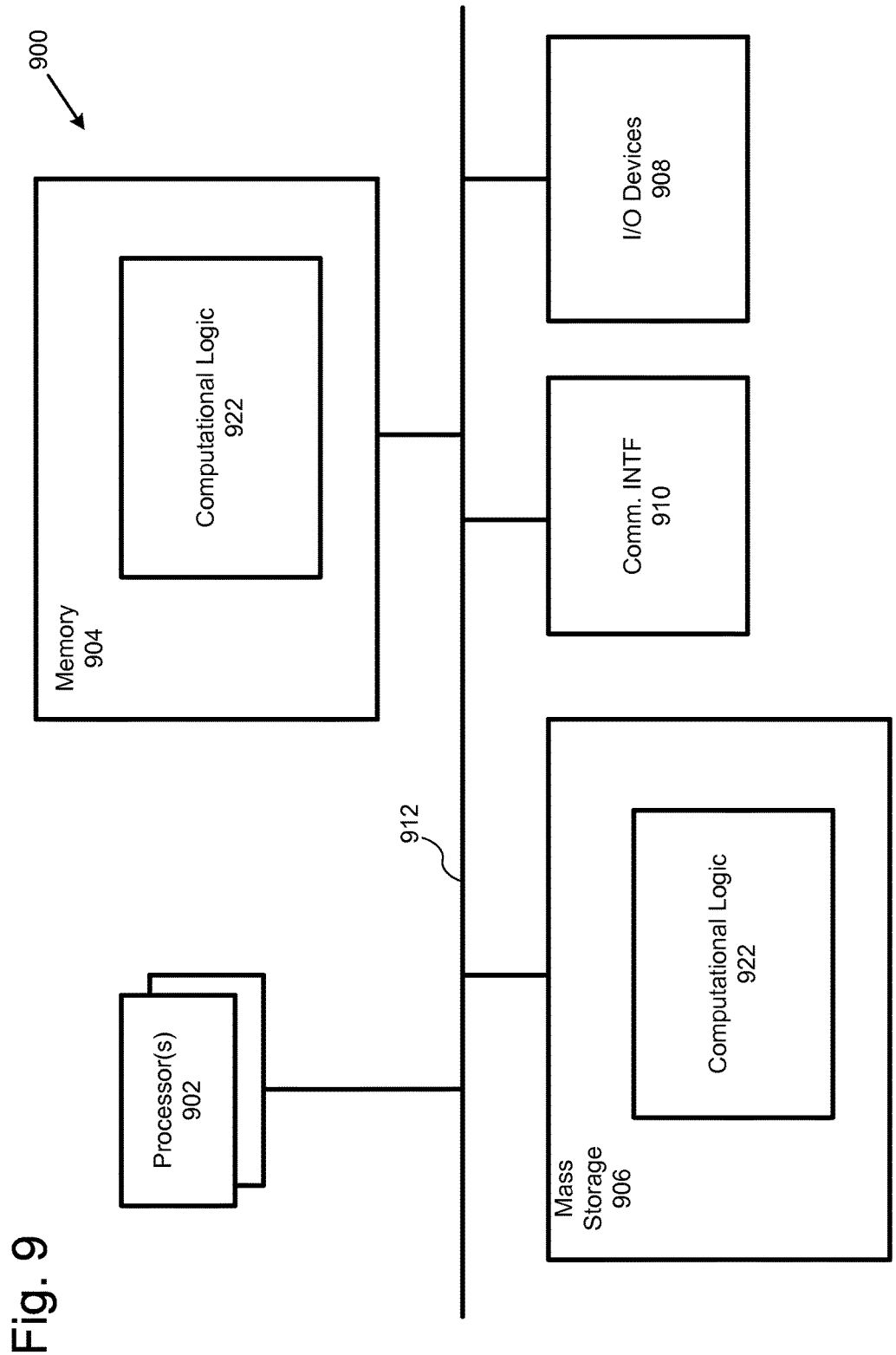
FIG. 9 illustrates an example computing environment suitable for practicing various aspects of the present disclosure in accordance with various embodiments.

Referring now to FIG. 9, an example computer suitable for practicing various aspects of the present disclosure, including processes of FIGS. 4-8, is illustrated in accordance with various embodiments. As shown, computer 900 may include one or more processors or processor cores 902, and system memory 904. For the purpose of this application, including the claims, the terms "processor" and "processor cores" may be considered synonymous, unless the context clearly requires otherwise. Additionally, computer 900 may include mass storage devices 906 (such as diskette, hard drive, compact disc read only memory (CD-ROM) and so forth), input/output devices 908 (such as display, keyboard, cursor control, remote control, gaming controller, image capture device, and so forth) and communication interfaces 910 (such as network interface cards, modems, infrared receivers, radio receivers (e.g., Bluetooth, Wi-Fi, Near Field Communications, Radio-frequency identification, and so forth). The elements may be coupled to each other via system bus 912, which may represent one or more buses. In the case of multiple buses, they may be bridged by one or more bus bridges (not shown).

Each of these elements may perform its conventional functions known in the art. In particular, system memory 904 and mass storage devices 906 may be employed to store a working copy and a permanent copy of the programming instructions implementing one or more of the modules shown in FIG. 3, and/or the operations associated with techniques shown in FIGS. 4-8, collectively referred to as computing logic 922. The various elements may be implemented by assembler instructions supported by processor(s) 902 or high-level languages, such as, for example, C, that can be compiled into such instructions. In various embodiments, the system memory 904 or mass storage 906 may include various memory implementations, including integrated flash memory, such as in a System on a Chip, a USB flash drive, SD Card, on SATA SSD, etc.

The permanent copy of the programming instructions may be placed into permanent storage devices 906 in the factory, or in the field, through, for example, a distribution medium (not shown), such as a compact disc (CD), or through communication interface 910 (from a distribution server (not shown)). In embodiments, the programming instructions may be stored in one or more computer readable non-transitory storage media. In other embodiments, the programming instructions may be encoded in transitory storage media, such as signals.

The number, capability and/or capacity of these elements 910-912 may vary. Their constitutions are otherwise known, and accordingly will not be further described.

Figure 10:
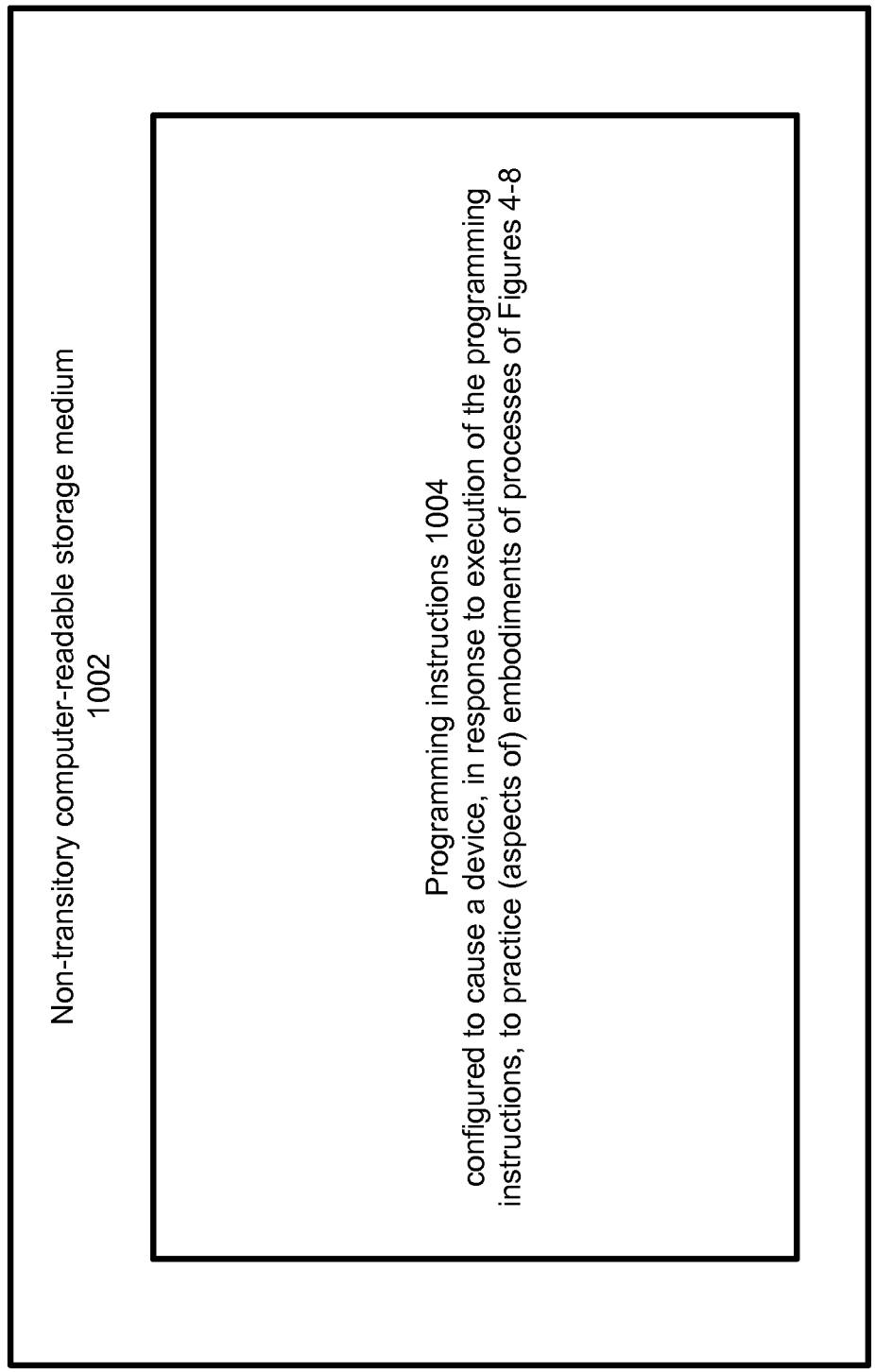
FIG. 10 illustrates an example storage medium with instructions configured to enable an apparatus to practice various aspects of the present disclosure in accordance with various embodiments.

FIG. 10 illustrates an example least one computer-readable storage medium 1002 having instructions configured to practice all or selected ones of the operations associated with the techniques earlier described, in accordance with various embodiments. As illustrated, least one non-transitory computer-readable storage medium 1002 may include a number of programming instructions 1004. Programming instructions 1004 may be configured to enable a device, e.g., computer 900, in response to execution of the programming instructions, to perform, e.g., various operations of processes of FIGS. 4-8, e.g., but not limited to, to the various operations performed to perform dynamic audio configuration techniques described herein. In alternate embodiments, programming instructions 1004 may be disposed on multiple least one non-transitory computer-readable storage media 1002 instead. In still other embodiment, programming instructions 1004 may be disposed on transitory computer-readable storage medium, such as signal, instead.

Referring back to FIG. 9, for one embodiment, at least one of processors 902 may be packaged together with computational logic 922 configured to practice aspects of processes of FIGS. 4-8. For one embodiment, at least one of processors 902 may be packaged together with computational logic 922 configured to practice aspects of processes of FIGS. 4-8 to form a System in Package (SiP). For one embodiment, at least one of processors 902 may be integrated on the same die with computational logic 922 configured to practice aspects of processes of FIGS. 4-8. For one embodiment, at least one of processors 902 may be packaged together with computational logic 922 configured to practice aspects of processes of FIGS. 4-8 to form a System on Chip (SoC). For at least one embodiment, the SoC may be utilized in, e.g., but not limited to, a computing tablet. (e.g., Wi-Fi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an audio production node for adjustment of audio during audio production. The audio production node may include one or more computer processors. The audio production node may also include an audio producer to operate on the one or more computer processors to produce audio based on audio production data received from a host node, wherein the audio producer may be to produce audio based on one or more audio configuration settings. The audio production node may also include an audio configuration modifier to operate on the one or more computer processors to modify the audio configuration settings during audio production, wherein the audio configuration modifier may be to modify the audio configuration settings based at least in part on configuration-related data received from one or more other audio production nodes that produce audio based on the same audio production data respectively received from the host node.

Example 2 may include the audio production node of example 1, wherein the audio configuration modifier may be to modify the audio configuration settings based on configuration-related data that indicates that another audio production node has ceased producing audio.

Example 3 may include the audio production node of example 1, wherein the audio configuration modifier may be to modify the audio configuration settings based on received audio adjustment data that describe one or more differences between audio data received by an audio sensor of one or more of the other audio production nodes and the audio production data.

Example 4 may include the audio production node of example 1, wherein the audio configuration modifier may be to modify the audio configuration settings based on received audio adjustment data that describe suggested adjustments to be made to the audio configuration settings.

Example 5 may include the audio production node of example 1, wherein the audio configuration modifier may be to modify one or more of pitch, amplitude or timing of audio produced by the audio producer, based at least in part on configuration-related data received from the one or more other audio production nodes producing the audio production data.

Example 6 may include the audio production node of any of examples 1-5, wherein the audio configuration modifier may be to modify the audio configuration settings in association with transmission of clock updates between the audio production node and the one or more other audio production nodes, based at least in part on configuration-related data received from one or more other audio production nodes producing the audio production data.

Example 7 may include the audio production node of example 6, wherein the audio configuration modifier may be to modify the audio configuration settings in association with transmission of clock updates while implementing a Precision Time Protocol that provides clock synchronization between audio production nodes.

Example 8 may include the audio production node of any of examples 1-7, wherein the apparatus may further include an audio sensor to sense audio and provide audio data and an audio adjustment data generator coupled to the audio sensor, wherein the audio adjustment data generator may be to operate on the one or more computer processors to generate audio adjustment data for transmission to the one or more other audio production nodes based on audio sensor data received from the audio sensor.

Example 9 may include the audio production node of example 8, wherein the audio adjustment data generator may be to generate audio adjustment data for transmission to the one or more other audio production nodes in association with transmission of clock updates between the audio production node and the one or more other audio production nodes.

Example 10 may include the audio production node of example 8, wherein the audio adjustment data generator may be to generate audio adjustment data for transmission to the one or more other audio production nodes based on a comparison of the audio production data to the audio data received from the audio sensor.

Example 11 may include the audio production node of example 10, wherein the audio adjustment generator may be to determine whether the audio data received from the audio sensor is in sync with audio that is described by the received audio production data.

Example 12 may include the audio production node of example 8, wherein the audio adjustment generator may further be to store audio configuration settings of the one or more other audio production nodes, and may be to generate audio adjustment data for transmission to the one or more other audio production nodes based at least in part on the audio configuration settings of the one or more other audio production nodes.

Example 13 may include the audio production node of example 8, wherein the audio adjustment generator may be to determine whether the audio data received from the audio sensor differs in pitch or amplitude with audio described by the received audio production data.

Example 14 may include the audio production node of example 8, wherein the audio adjustment data may include timing adjustment information.

Example 15 may include the audio production node of example 8, wherein the audio adjustment data may include pitch adjustment information.

Example 16 may include the audio production node of example 8, wherein the audio adjustment data may include amplitude adjustment information.

Example 17 may include the audio production node of any of examples 1-16, wherein the apparatus further may include an audio data communicator coupled to the one or more computer processors and the audio data communicator may be to receive the audio production data and the audio adjustment data.

Example 18 may include the audio production node of example 17, wherein the audio data communicator may include a wireless networking transceiver.

Example 19 may include one or more non-transitory computer-readable media containing instructions written thereon that, in response to execution on an audio production node, cause the audio production node to adjust audio during audio production. The instructions may cause the audio production node to produce audio based on audio production data received from a host node, wherein the audio is produced based on one or more audio configuration settings. The instructions may also cause the audio production node to modify the audio configuration settings during audio production based at least in part on configuration-related data received from one or more other audio production nodes that produce audio based on the same audio production data respectively received from the host node.

Example 20 may include the one or more non-transitory computer-readable media of example 19, wherein modify the audio configuration settings may include modify the audio configuration settings based on configuration-related data that indicates that another audio production node has ceased producing audio.

Example 21 may include the one or more non-transitory computer-readable media of example 19, wherein modify the audio configuration settings may include modify the audio configuration settings based on received audio adjustment data that describe one or more differences between audio data received by an audio sensor of one or more of the other audio production nodes and the audio production data.

Example 22 may include the one or more non-transitory computer-readable media of example 19, wherein modify the audio configuration settings may include modify the audio configuration settings based on received audio adjustment data that describe suggested adjustments to be made to the audio configuration settings.

Example 23 may include the one or more non-transitory computer-readable media of example 19, wherein modify the audio configuration settings may include modify one or more of pitch, amplitude or timing of audio produced by the audio production node, based at least in part on configuration-related data received from the one or more other audio production nodes producing the audio production data.

Example 24 may include the one or more non-transitory computer-readable media of any of examples 19-23, wherein modify the audio configuration settings may include modify the audio configuration settings in association with transmission of clock updates between the audio production node and the one or more other audio production nodes, based at least in part on configuration-related data received from one or more other audio production nodes producing the audio production data.

Example 25 may include the one or more non-transitory computer-readable media of example 24, wherein modify the audio configuration settings may include modify the audio configuration settings in association with transmission of clock updates while implementing a Precision Time Protocol that provides clock synchronization between audio production nodes.

Example 26 may include the one or more non-transitory computer-readable media of any of examples 19-25, wherein the instructions may be further to cause the audio production node to generate audio adjustment data for transmission to the one or more other audio production nodes based on audio sensor data received from an audio sensor.

Example 27 may include the one or more non-transitory computer-readable media of example 26, wherein generate audio adjustment data may include generate audio adjustment data in association with transmission of clock updates between the audio production node and the one or more other audio production nodes.

Example 28 may include the one or more non-transitory computer-readable media of example 26, wherein generate audio adjustment data may include generate audio adjustment data based on a comparison of the audio production data to the audio data received from the audio sensor.

Example 29 may include the one or more non-transitory computer-readable media of example 28, wherein the instructions may be further to cause the audio production node to determine whether the audio data received from the audio sensor is in sync with audio that is described by the received audio production data.

Example 30 may include the one or more non-transitory computer-readable media of example 26, wherein the instructions may be further to cause the audio production node to store audio configuration settings of the one or more other audio production nodes and generate audio adjustment data may include generate audio adjustment data based at least in part on the audio configuration settings of the one or more other audio production nodes.

Example 31 may include the one or more non-transitory computer-readable media of example 26, wherein the instructions may be further to cause the audio production node to determine whether the audio data received from the audio sensor differs in pitch or amplitude with audio described by the received audio production data.

Example 32 may include the one or more non-transitory computer-readable media of example 26, wherein the audio adjustment data may include timing adjustment information.

Example 33 may include the one or more non-transitory computer-readable media of example 26, wherein the audio adjustment data may include pitch adjustment information.

Example 34 may include the one or more non-transitory computer-readable media of example 26, wherein the audio adjustment data may include amplitude adjustment information.

Example 35 may include a computer-implemented method for adjusting audio during audio production. The method may include producing, by an audio production node, audio based on audio production data received from a host node, wherein the audio is produced based on one or more audio configuration settings. The method may further include modifying, by the audio production node, the audio configuration settings during audio production based at least in part on configuration-related data received from one or more other audio production nodes that produce audio based on the same audio production data respectively received from the host node.

Example 36 may include the method of example 35, wherein modifying the audio configuration settings may include modifying the audio configuration settings based on configuration-related data that indicates that another audio production node has ceased producing audio.

Example 37 may include the method of example 35, wherein modifying the audio configuration settings may include modifying the audio configuration settings based on received audio adjustment data that describe one or more differences between audio data received by an audio sensor of one or more of the other audio production nodes and the audio production data.

Example 38 may include the method of example 35, wherein modifying the audio configuration settings may include modifying the audio configuration settings based on received audio adjustment data that describe suggested adjustments to be made to the audio configuration settings.

Example 39 may include the method of example 35, wherein modifying the audio configuration settings may include modifying one or more of pitch, amplitude or timing of audio produced by the audio production node, based at least in part on configuration-related data received from the one or more other audio production nodes producing the audio production data.

Example 40 may include the method of any of examples 35-39, wherein modifying the audio configuration settings may include modifying the audio configuration settings in association with transmission of clock updates between the audio production node and the one or more other audio production nodes, based at least in part on configuration-related data received from one or more other audio production nodes producing the audio production data.

Example 41 may include the method of example 40, wherein modifying the audio configuration settings may include modifying the audio configuration settings in association with transmission of clock updates while implementing a Precision Time Protocol that provides clock synchronization between audio production nodes.

Example 42 may include the method of any of examples 35-41, and may further include generating, by the audio production node, audio adjustment data for transmission to the one or more other audio production nodes based on audio sensor data received from an audio sensor.

Example 43 may include the method of example 42, wherein generating audio adjustment data may include generating audio adjustment data in association with transmission of clock updates between the audio production node and the one or more other audio production nodes.

Example 44 may include the method of example 42, wherein generating audio adjustment data may include generating audio adjustment data based on a comparison of the audio production data to the audio data received from the audio sensor.

Example 45 may include the method of example 44, and may further include determining, by the audio production node, whether the audio data received from the audio sensor is in sync with audio that is described by the received audio production data.

Example 46 may include the method of example 42, wherein the method may further include storing, by the audio production node, audio configuration settings of the one or more other audio production nodes and generating audio adjustment data may include generating audio adjustment data based at least in part on the audio configuration settings of the one or more other audio production nodes.

Example 47 may include the method of example 42, and may further include determining, by the audio production node, whether the audio data received from the audio sensor differs in pitch or amplitude with audio described by the received audio production data.

Example 48 may include the method of example 42, wherein the audio adjustment data may include timing adjustment information.

Example 49 may include the method of example 42, wherein the audio adjustment data may include pitch adjustment information.

Example 50 may include the method of example 42, wherein the audio adjustment data may include amplitude adjustment information.

Example 51 may include an audio production node for adjusting audio during audio production. The audio production node may include means for producing audio based on audio production data received from a host node, wherein the audio is produced based on one or more audio configuration settings. The audio production node may further include means for modifying the audio configuration settings during audio production based at least in part on configuration-related data received from one or more other audio production nodes that produce audio based on the same audio production data respectively received from the host node.

Example 52 may include the audio production node of example 51, wherein means for modifying the audio configuration settings may include means for modifying the audio configuration settings based on configuration-related data that indicates that another audio production node has ceased producing audio.

Example 53 may include the audio production node of example 51, wherein means for modifying the audio configuration settings may include means for modifying the audio configuration settings based on received audio adjustment data that describe one or more differences between audio data received by an audio sensor of one or more of the other audio production nodes and the audio production data.

Example 54 may include the audio production node of example 51, wherein means for modifying the audio configuration settings may include means for modifying the audio configuration settings based on received audio adjustment data that describe suggested adjustments to be made to the audio configuration settings.

Example 55 may include the audio production node of example 51, wherein means for modifying the audio configuration settings may include means for modifying one or more of pitch, amplitude or timing of audio produced by the audio production node, based at least in part on configuration-related data received from the one or more other audio production nodes producing the audio production data.

Example 56 may include the audio production node of any of examples 51-55, wherein means for modifying the audio configuration settings may include means for modifying the audio configuration settings in association with transmission of clock updates between the audio production node and the one or more other audio production nodes, based at least in part on configuration-related data received from one or more other audio production nodes producing the audio production data.

Example 57 may include the audio production node of example 56, wherein means for modifying the audio configuration settings may include means for modifying the audio configuration settings in association with transmission of clock updates while implementing a Precision Time Protocol that provides clock synchronization between audio production nodes.

Example 58 may include the audio production node of any of examples 51-57, and may further include means for generating audio adjustment data for transmission to the one or more other audio production nodes based on audio sensor data received from an audio sensor.

Example 59 may include the audio production node of example 58, wherein means for generating audio adjustment data may include means for generating audio adjustment data in association with transmission of clock updates between the audio production node and the one or more other audio production nodes.

Example 60 may include the audio production node of example 58, wherein means for generating audio adjustment data may include means for generating audio adjustment data based on a comparison of the audio production data to the audio data received from the audio sensor.

Example 61 may include the audio production node of example 60, and may further include means for determining whether the audio data received from the audio sensor is in sync with audio that is described by the received audio production data.

Example 62 may include the audio production node of example 58, wherein the audio production node further may include means for storing audio configuration settings of the one or more other audio production nodes and means for generating audio adjustment data may include means for generating audio adjustment data based at least in part on the audio configuration settings of the one or more other audio production nodes.

Example 63 may include the audio production node of example 58, wherein the audio production node further may include means for determining whether the audio data received from the audio sensor differs in pitch or amplitude with audio described by the received audio production data.

Example 64 may include the audio production node of example 58, wherein the audio adjustment data may include timing adjustment information.

Example 65 may include the audio production node of example 58, wherein the audio adjustment data may include pitch adjustment information.

Example 66 may include the audio production node of example 58, wherein the audio adjustment data may include amplitude adjustment information.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An audio production node, comprising:
   one or more computer processors;
   an audio producer to operate on the one or more computer processors to produce audio based on audio production data received from a host node, wherein the audio producer is to produce audio based on one or more audio configuration settings; and
   an audio configuration modifier to operate on the one or more computer processors to modify the audio configuration settings during audio production, wherein the audio configuration modifier is to modify the audio configuration settings of the audio production node based at least in part on configuration-related data received from one or more other audio production nodes that produce audio based on the same audio production data respectively received from the host node.

2. The audio production node of claim 1, wherein the audio configuration modifier is to modify the audio configuration settings based on configuration-related data that indicates that another audio production node has ceased producing audio.

3. The audio production node of claim 1, wherein the audio configuration modifier is to modify the audio configuration settings based on received audio adjustment data that describe one or more differences between audio data received by an audio sensor of one or more of the other audio production nodes and the audio production data.

4. The audio production node of claim 1, wherein the audio configuration modifier is to modify the audio configuration settings based on received audio adjustment data that describe suggested adjustments to be made to the audio configuration settings.

5. The audio production node of claim 1, wherein the audio configuration modifier is to modify one or more of pitch, amplitude or timing of audio produced by the audio producer, based at least in part on configuration-related data received from the one or more other audio production nodes producing the audio production data.

6. The audio production node of claim 1, wherein the audio configuration modifier is to modify the audio configuration settings in association with transmission of clock updates between the audio production node and the one or more other audio production nodes, based at least in part on configuration-related data received from one or more other audio production nodes producing the audio production data.

7. The audio production node of claim 6, wherein the audio configuration modifier is to modify the audio configuration settings in association with transmission of clock updates while implementing a Precision Time Protocol that provides clock synchronization between audio production nodes.

8. The audio production node of claim 1, wherein the audio production node further comprises:
   an audio sensor to sense audio and provide audio data; and
   an audio adjustment data generator coupled to the audio sensor, wherein the audio adjustment data generator is to operate on the one or more computer processors to generate audio adjustment data for transmission to the one or more other audio production nodes based on audio sensor data received from the audio sensor.

9. The audio production node of claim 8, wherein the audio adjustment data generator is to generate audio adjustment data for transmission to the one or more other audio production nodes in association with transmission of clock updates between the audio production node and the one or more other audio production nodes.

10. The audio production node of claim 8, wherein the audio adjustment data generator is to generate audio adjustment data for transmission to the one or more other audio production nodes based on a comparison of the audio production data to the audio data received from the audio sensor.

11. The audio production node of claim 10, wherein the audio adjustment data generator is to determine whether the audio data received from the audio sensor is in sync with audio that is described by the received audio production data.

12. The audio production node of claim 8, wherein the audio adjustment data generator is to further store audio configuration settings of the one or more other audio production nodes, and is to generate audio adjustment data for transmission to the one or more other audio production nodes based at least in part on the audio configuration settings of the one or more other audio production nodes.

13. The audio production node of claim 8, wherein the audio adjustment data generator is to determine whether the audio data received from the audio sensor differs in pitch or amplitude with audio described by the received audio production data.

14. The audio production node of claim 8, wherein the audio adjustment data includes one or more of: timing adjustment information, pitch adjustment information, or amplitude adjustment information.

15. One or more non-transitory computer-readable media containing instructions written thereon that, in response to execution on an audio production node, cause the audio production node to:
produce audio based on audio production data received from a host node, wherein the audio is produced based on one or more audio configuration settings; and
modify the audio configuration settings of the audio production node during audio production based at least in part on configuration-related data received from one or more other audio production nodes that produce audio based on the same audio production data respectively received from the host node.

16. The one or more non-transitory computer-readable media of claim 15, wherein modify the audio configuration settings comprises modify the audio configuration settings based on configuration-related data that indicates that another audio production node has ceased producing audio.

17. The one or more non-transitory computer-readable media of claim 15, wherein modify the audio configuration settings comprises modify the audio configuration settings based on received audio adjustment data that describe one or more differences between audio data received by an audio sensor of one or more of the other audio production nodes and the audio production data.

18. The one or more non-transitory computer-readable media of claim 15, wherein modify the audio configuration settings comprises modify the audio configuration settings based on received audio adjustment data that describe suggested adjustments to be made to the audio configuration settings.

19. The one or more non-transitory computer-readable media of claim 15, wherein modify the audio configuration settings comprises modify one or more of pitch, amplitude or timing of audio produced by the audio production node, based at least in part on configuration-related data received from the one or more other audio production nodes producing the audio production data.

20. The one or more non-transitory computer-readable media of claim 15, wherein modify the audio configuration settings comprises modify the audio configuration settings in association with transmission of clock updates between the audio production node and the one or more other audio production nodes, based at least in part on configuration-related data received from one or more other audio production nodes producing the audio production data.

21. The one or more non-transitory computer-readable media of claim 15, wherein the instructions are further to cause the audio production node to generate audio adjustment data for transmission to the one or more other audio production nodes based on audio sensor data received from an audio sensor.

22. A computer-implemented method, comprising:
producing, by an audio production node, audio based on audio production data received from a host node, wherein the audio is produced based on one or more audio configuration settings; and
modifying, by the audio production node, the audio configuration settings during audio production based at least in part on configuration-related data received from one or more other audio production nodes that produce audio based on the same audio production data respectively received from the host node.

23. The method of claim 22, wherein modifying the audio configuration settings comprises modifying the audio configuration settings based on received audio adjustment data that describe one or more differences between audio data received by an audio sensor of one or more of the other audio production nodes and the audio production data or suggested adjustments to be made to the audio configuration settings.

24. The method of claim 22, wherein modifying the audio configuration settings comprises modifying the audio configuration settings in association with transmission of clock updates between the audio production node and the one or more other audio production nodes, based at least in part on configuration-related data received from one or more other audio production nodes producing the audio production data.

* * * * *